United States Patent [19]

Bondarev et al.

[11] 3,798,014

[45] Mar. 19, 1974

[54] METHOD OF MANUFACTURING CRYSTALLINE GLASS ARTICLES

[76] Inventors: Konstantin Timofeevich Bondarev, ul. Yanvarskogo vosstania, 24-a, kv. 60, Kiev; Tamara Efimovna Golius, ul. Pushkinskaya, 291, kv. 6, Konstantinovka Donetskoi oblasti; Anatoly Gavrilovich Minakov, ul. Levanevskogo, 18, kv. 11, Konstantinovka Donetskoi oblasti; Vladimir Anatolievich Minakov, ul. Aleandra Nevskogo, 18, kv. 31, Konstantinovka Donetskoi oblasti; Anatoly Vasilievich Strekalov, ul. Schmidta, 31, kv. 12, Konstantinovka Donetskoi oblasti, all of U.S.S.R.

[22] Filed: Nov. 5, 1970

[21] Appl. No.: 87,101

Related U.S. Application Data

[63] Continuation-in-part of Ser. Nos. 703,272, Feb. 6, 1968, abandoned, and Ser. No. 703,543, Feb. 7, 1968, abandoned, and Ser. No. 717,453, March 29, 1968, abandoned.

[52] U.S. Cl. ................................................ 65/33
[51] Int. Cl. .............................................. C03c 3/22
[58] Field of Search .......................................... 65/33

[56] References Cited

UNITED STATES PATENTS

| 3,113,877 | 12/1963 | Janakiramarao | 65/33 X |
|---|---|---|---|
| 3,282,711 | 11/1966 | Lin | 65/33 X |
| 3,220,870 | 11/1965 | Loehrke | 65/33 X |
| 3,241,935 | 3/1966 | Stookey | 65/33 |
| 3,524,738 | 8/1970 | Grubb | 65/33 X |
| 3,300,670 | 1/1967 | Veres | 65/33 X |
| 3,170,780 | 2/1965 | Takehara et al. | 65/33 X |
| 3,157,522 | 11/1964 | Stookey | 65/33 X |
| 3,352,698 | 11/1967 | McMillan et al. | 65/33 X |
| 3,113,009 | 12/1963 | Brown et al. | 65/33 |
| 3,464,806 | 9/1969 | Seki et al. | 65/33 |
| 3,677,728 | 7/1972 | Kithigorudsky | 65/33 |

Primary Examiner—Frank W. Miga
Attorney, Agent, or Firm—Waters, Roditi, Schwartz & Nissen

[57] ABSTRACT

A method of making crystalline glass products, comprising: melting the batch mix to obtain a glass crystallizable about the microparticles of metal sulfides present therein, cooling the glass mass to a temperature of 670°–750°C with simultaneous shaping of the material, holding the material at said temperature, raising its temperature to 930°–970°C at a rate of 75°–320°C per hour, holding the material at that temperature, and its subsequently cooling at a controlled rate.

2 Claims, 4 Drawing Figures

METHOD OF MANUFACTURING CRYSTALLINE GLASS ARTICLES

This application is a continuation-in-part application of Ser. No. 703,272, filed Feb. 6, 1968; Ser. No. 703,543, filed Feb. 7, 1968; and Ser. No. 717,453, filed Mar. 29, 1968, all now abandoned.

The invention relates to a method of making crystalline glass products of strip or tube type from a continuous strip of glass having appropriate shaping and crystallizing properties, and converted, upon heat treatment, into a material of white, gray, or other color, possessing high mechanical properties, as well as chemical and abrasive resistance.

Well-known in the art are U.S. Pat. Nos. 2,920,971 and 3,157,522 (Stookey), which concern crystalline glass products obtained by controlled crystallization of glass of varying compositions, including $TiO_2$, $Li_2O$, $Al_2O_3$, $SiO_2$, $P_2O_5$, $B_2O_3$, etc.

The batch mixture of a required composition is fused to obtain the glass melt shaped from which is shaped the article, which is then completely or partially cooled. Thereupon the article is heated following a definite schedule, to crystallize the glass. In the course of the reheating process there are formed and growing in the glass microparticles, for example of $TiO_2$, which serve as nuclei for crystallizing the bulk of the glass.

Based on the same idea are more recent U.S. Pat. Nos. 3,161,528 (Eppler), 3,170,780 (Takehara), 3,241,985 (Kuwayama), and 3,352,698 (McMillan), which differ from Stookey's patents only in the compositions of the crystallizable glass, and in the functions and properties of the products obtained.

The above-described methods are based on using expensive components, such as $TiO_2$, $Li_2O$, $P_2O_5$, and feature complex processes involving glass reheating to crystallize it, which reduces the production efficiency.

Besides that, the products made by these methods have insufficient mechanical properties, strength and impact elasticity in particular.

The basic object of the proposed invention is to provide a highly efficient method of making crystalline glass products by a continuous shaping of the glass strip and its heat treatment, which makes possible cutting the furnace length, and significantly reducing power consumption.

Another object of the invention is producing crystalline glass articles characterized by high mechanical properties, for instance, impact elasticity and strength.

In accordance with the said and other objects, the proposed method of making crystalline glass products of strip or tube type comprises the following operations: melting the batch mixture until a glass composition is obtained that can crystallize about the microcrystals of metal sulfides present therein; cooling the glass mass to a temperature of 670°–750°C, with nucleation and simultaneous continuous shaping of the glass; holding the articles at said temperature; raising the temperature of the articles to 930°–970°C at a rate of 75°–320°C per hour; holding the articles at said temperature to achieve the required degree of their crystallization, and subsequent cooling of the articles at a controlled rate.

For some glass compositions maintaining the articles at the temperature of 930°–970°C is advantageous to effect for 10–70 min. depending on the article thickness, and their subsequent cooling should be done at a rate of 200°–450°C per hour, for annealing.

To increase impact elasticity, the articles are advisably held at the temperature of 930°–970°C until the crystalline phase in the glass reaches 60–80 percent of its maximum possible amount, while the subsequent cooling of the articles should be conducted at a rate of 85°–250°C per min., for hardening.

In case mechanical working is required, for example, cutting the strip into separate articles and making holes, after holding it at the temperature of 930°–970°C to form the crystalline phase in glass in the ratio of 60–80 percent of the maximum possible amount thereof, the material is slowly cooled to normal temperature, where the required mechanical working is done, and then again heated to the temperature of 930°–970°C, and kept at this temperature for a time calculated on the basis of 1.5–3 min. per each millimeter of thickness, before final cooling.

Unlike the conventional methods providing for glass crystallization after partial or complete cooling of the material, according to the proposed method, the shaped material, upon reaching the temperature of nucleation, is held at this temperature, with subsequent heating to a temperature securing the required degree of crystallization.

Elimination of the operations connected with the cooling of the glass articles after their shaping, and their reheating to effect nucleation, significantly (by several tens of meters) reduces the furnace length, and cuts power consumption, which in combination with the continuity of the production process sharply raises its efficiency.

The idea of the invention consists in that a glass melt of an appropriate composition is shaped by continuous rolling, drawing, casting, or other methods, and while being in this process cooled from liquidus to the temperature of shape fixing, it segregates with subsequent crystallization of microparticles serving as the nuclei for the crystallization of all the glass mass at an insignificant secondary temperature rise.

In case the mechanical properties are to be further stepped up, the crystallization process is interrupted after the crystalline phase in glass reaches 60–80 percent, by abrupt cooling according to hardening conditions. In this case additional stresses are induced in the residual amorphous phase in between the crystals involving a strengthening effect.

Figure 1:
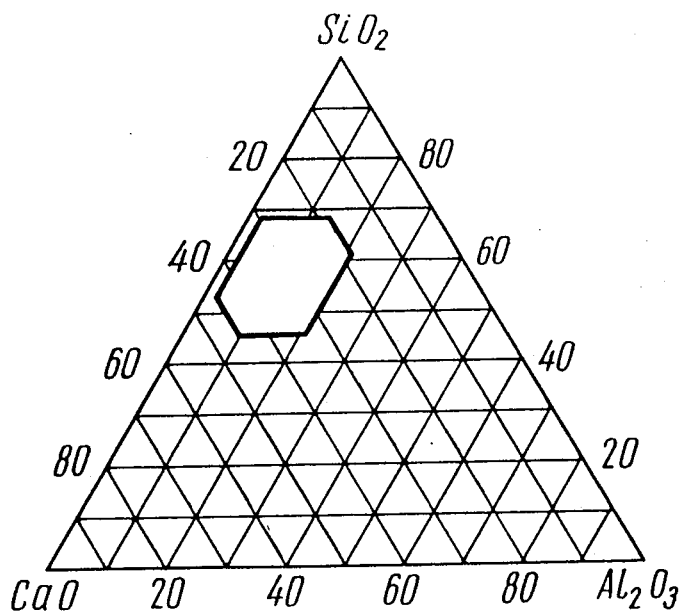
FIG. 1 shows a $CaO-Al_2O_3-SiO_2$ system, wherein circumscribed is the area of glass compositions suitable, as to the content of such components, as $SiO_2$, CaO, $Al_2O_3$, for realizing the instant invention.

This invention is practically carried out as follows. The main components in the glass should be $SiO_2$, $CaO$, and $Al_2O_3$, proportioned as within the area shown in FIG. 1. Besides that, the glass may comprise, in weight, up to 5 percent of $Na_2O$, and up to 2 percent of fluoride, as modifying agents regulating the viscosity and crystallization properties, as well as iron sulfide whose microparticles serve as the nuclei of crystallization.

The required amount of iron sulfide is secured through a controlled content of bivalent (sulfide) sulfur within from 0.3 to 0.5 percent, and a non-controlled, but sufficient for a stoichiometric reaction, quantity of iron ions, in the melt. The glass melt of said composition is cooled from liquidus following the schedule of FIG. 2. Section AB features fast cooling of the material concurrent with its shaping, in which process the appropriate quantity of FeS nuclei is formed through segregation and crystallization.

Within section BC (FIG. 2) the material is maintained for 10–70 min. at a temperature of 670°–750°C, to stabilize the structure, and realize the growth of the sulfide microparticles. The material is then heated within section CD (FIG. 2) at a rate of 75°–320°C per hour up to 930°–970°C, to initiate, about the sulfide microparticles, the crystals of the basic (silicate) phase of the composition, i.e., $\alpha$-$CaSiO_3$ or $\beta$-$CaSiO_3$. In section DE at the temperature of 930°–970°C and a time exposure of 10–70 min. the crystallization process is stabilized, and finished with the obtention of a fine-grained and uniform material in the subsequent cooling process in section EF at a rate of 200°–450°C per hour.

From point F normal annealing is done, whose schedule is determined by the thickness and shape of the article.

The proposed method permits producing a continuous flat or corrugated strip of crystalline glass material with a thickness of 10–15 mm. for 2.5–3 hours from the starting moment of shaping, i.e., at least 3 times faster than by the previously known methods, on account of the concurrence of the shaping processes with the initial stage of crystallization.

Figure 3:
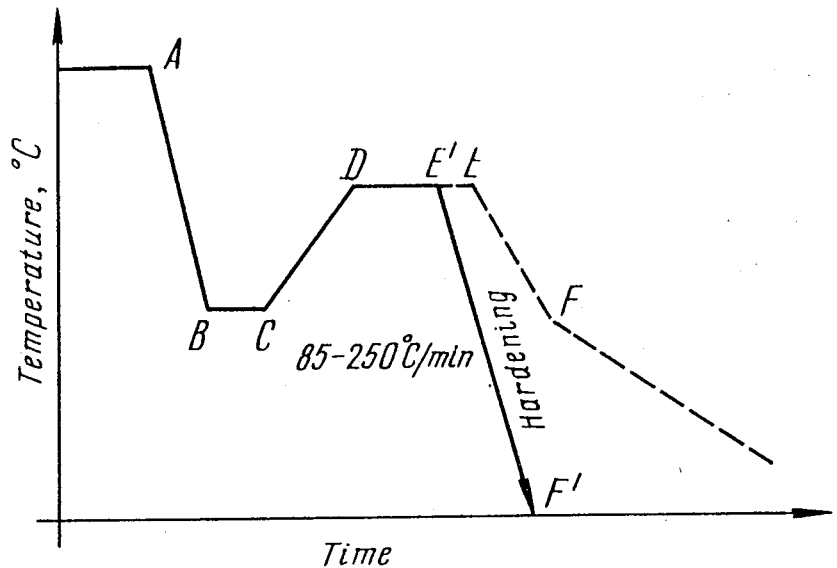
FIG. 3 shows a possible version of the heat treatment aimed at obtaining crystalline glass products having a 2.5-3 times higher impact elasticity as compared to the material crystallized without quenching.

To raise the impact elasticity and strength of the material, the crystallization process in section DE is stopped by abrupt cooling at a rate of 85°–250°C per min. to normal temperature (section E′F′ in FIG. 3).

Figure 4:
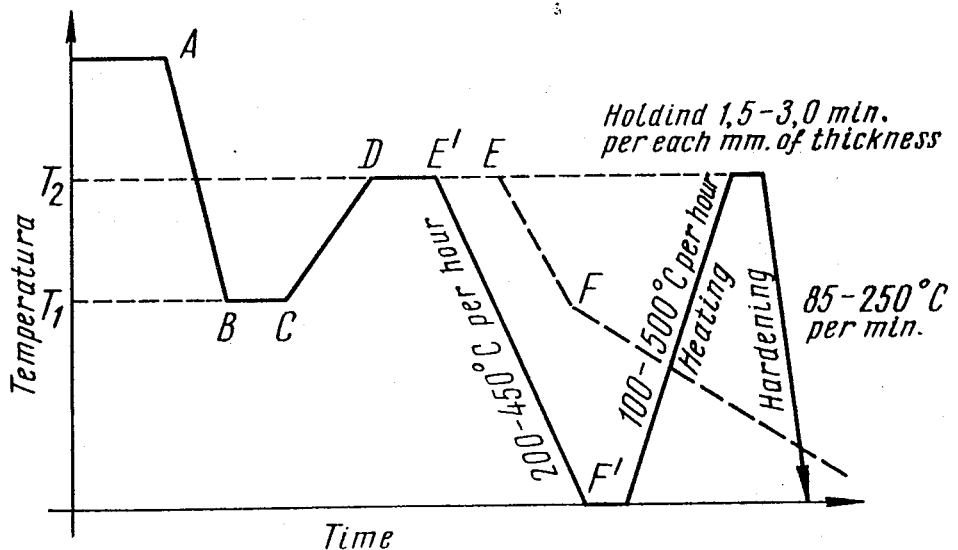
FIG. 4 shows a version of the heat treatment procedure with quenching, wherein prior to the quenching process the material is subjected to mechanical working.

In case the strip should be first cut into shaped articles, or holes should be made, the process of hardening the crystalline glass material can be effected after its production according to the procedure of FIG. 2, by reheating it at a rate of 100°–500°C per hour to the temperature of crystallization, and subsequently cooling it at a rate of 85°–250°C per min., according to the schedule shown in FIG. 4. In this case section DE is cut down to reduce the degree of crystallization to 60–80 percent of the theoretical crystalline phase (DE′).

This process is successfully accomplished if the coefficient of linear thermal expansion of the glass being processed exceeds $40.10^{-7}$ per deg. C.

For a better understanding of the idea of the invention given below are particular exemplary embodiments of our method to produce the crystalline glass material.

EXAMPLE 1.

The crystalline glass products were made of glass whose composition is claimed in our Ser. No. 696,122 filed Jan. 8, 1968, and protected by British Pat. No. 1,160,941, and Canadian Pat. No. 820,981. The glass comprises (in weight percent):

| | | | |
|---|---|---|---|
| $SiO_2$ | 59.0 | MnO | 0.3 |
| CaO | 23.0 | $Fe_2O_3$ | 0.2 |
| $Al_2O_3$ | 8.0 | $Na_2O$ | 4.5 |
| MgO | 1.5 | F | 2.5 | and sulfide sulfur ($S^{-2}$) — 0.5.

Such glass is obtained by melting a batch mix of the following components (in weight percent):

| | |
|---|---|
| metallurgical slag | 49.5 |
| quartz sand | 38.3 |
| sodium sulfate | 8.0 |
| clay | 6.0 |
| sodium fluosilicate | 5.6 |
| anthracite (coal) | 0.8 |

Instead of slag limestone and other mineral raw materials can be used.

The batch mix is melted in a glass furnace at a temperature of 1,480°±10°C, degassed, and cooled to a temperature of 1,200°C, where it is formed by rolling into a continuous strip 1,600 mm wide and 10 mm thick. After the forming machine the strip is immediately directed into a tunnel oven.

Here the strip temperature is brought to 700°C (section AB; FIG. 2), and is held there for 30 min. (BC, FIG. 2). Then the temperature is raised at a rate of 300°C per hour to 930°C (CD, FIG. 2). At this temperature the strip is held in the crystallizer for 30 min. (DE, FIG. 2), and then cooled at the rate of 450°C per hour to a temperature of 650°C (EF, FIG. 2).

There ends the normal process of crystallization, the strip being then annealed down to 70°C. The rate of cooling during annealing is 200°–300°C per hour.

The produced crystalline glass material possesses the following properties:

| | | |
|---|---|---|
| volume weight | | 2.6–2.7 g/cm³ |
| flexural strength | not below | 1,000 kg/cm² |
| compression strength | not below | 5,000 kg/cm² |
| modulus of elasticity | | $0.98.10^{-4}$ kg/cm² |
| specific impact elasticity | | 2.5–4 kgcm/cm² |
| abrasive resistance | | 0.01–0.02 g/cm² |
| chemical resistance in 96% $H_2SO_4$ | | 99.7–99.9% |
| breakdown potential at 50 cps | | 45–50 kv/mm |
| dielectric permeability | | 7.0–7.7 |
| specific electric volume resistance | | $1.7 \cdot 10^{12}$ ohm.cm. |

By cutting the continuously moving cooled strip flat articles (sheets) of required dimensions are obtained. Besides, that, shaped articles can be produced by this method using the techniques of casting, rolling, punching.

EXAMPLE 2.

Figure 2:
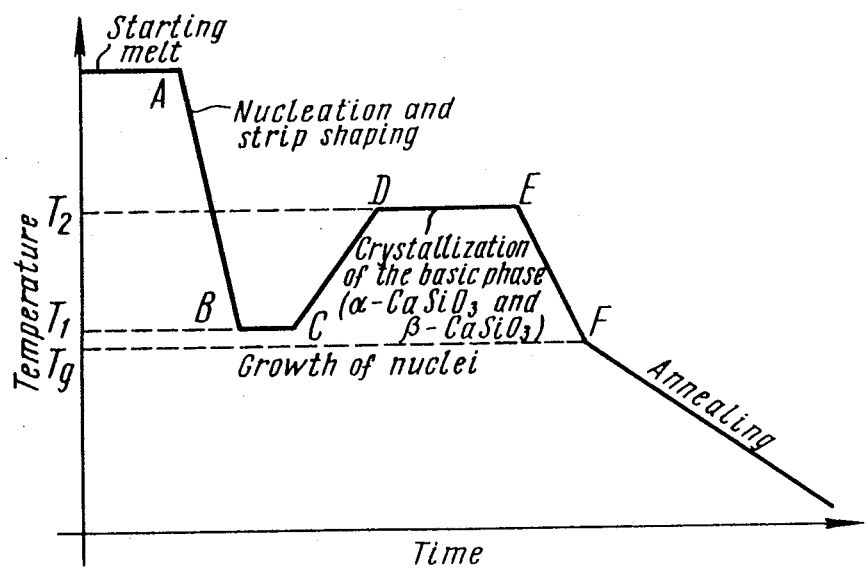
FIG. 2 shows a normal heat treatment procedure from the temperature of the starting melt to produce crystalline glass articles, including the shaping process concurrent with the first stage of crystallization (section AB), various operations continuing the process of crystallization (sections BCDEF), and ordinary annealing of the ready material (section starting at F).

The process of making crystalline glass products is conducted according to Example 1 until section DE of FIG. 2. To reduce the degree of crystallization to the amount of the crystalline phase being 60–80 percent of that maximum possible, the exposure time is cut by 5–10 min. (DE′, FIG. 3), whereupon the material is rapidly cooled at the rate of 250°C per min. (E′F′, FIG. 3).

As a result, the mechanical properties, mainly the impact elasticity of the material, are improved, the latter rising to 10.0–12.5 kgcm/cm².

EXAMPLE 3.

The process is conducted according to Example 2 until section E'F' (FIG. 4), whereas the cooling of the partially (by 60–80 percent) crystallized material is realized slowly, at a rate of 200°–450°C per hour.

After cooling the material to room temperature, it is subjected to the required mechanical working, such as cutting, drilling, grinding, polishing. Then the material is reheated at a rate of 300°C per hour to the temperature shown at $T_2$ (temperature of crystallization), and held there for a time calculated on the basis of 1.5–3.0 min. per each mm of thickness.

In the case of a strip 10 mm thick the exposure time equals 20 min. Thereupon the material is cooled at a rate of 85°–250°C per min., as is shown in FIG. 4, according to its thickness (from 4 to 20 mm).

The specific impact elasticity of the material produced by this method also increases to 10.0–12.5 kgcm/cm$^2$, as compared to Example 1.

What we claim is:

1. A method of making a crystalline glass product comprising the steps of melting a batch mix until a glass is obtained in which the main components are taken in the following quantities, in weight per cent: $SiO_2$, 45 to 69; CaO, 18 to 45; and $Al_2O_3$, 2 to 22; and sulfur sulfide in an amount from 0.3 to 0.5 weight percent, at least a stoichiometric quantity of iron ions, and further additives of $Na_2O$, up to 5 per cent, and fluorine, up to 2 per cent; shaping a product while the glass mass being shaped is cooled down to a temperature of 670°–750°C at which crystallization centers in the form of FeS are formed; holding the product at said temperature; raising the temperature of the product to 930°–970°C at a rate of 75°–320°C an hour; holding the product at said temperature to attain from 60 to 80 per cent of the maximum possible crystalline phase, and subsequently cooling the product at a rate of 85°–250°C per minute.

2. A method of making a crystalline glass product comprising the steps of melting a batch mix until a glass is obtained in which the main components are taken in the following quantities, in weight per cent: $SiO_2$, 45 to 69; CaO, 18 to 45; and $Al_2O_3$, 2 to 22; and sulfur sulfide in an amount from 0.3 to 0.5 per cent, at least a stoichiometric quantity of iron ions, and further additives of $Na_2O$, up to 5 per cent, and fluorine, up to 2 per cent; shaping a blank while the glass mass being shaped is cooled down to a temperature of 670°–750°C at which crystallization centers in the form of FeS are formed; holding the product at said temperature; raising the temperature to 930°–970°C at a rate of 75–320" an hour; holding the blank at said temperature in order to attain from 60 to 80 per cent of the maximum possible crystalline phase; gradually cooling the blank to room temperature; cutting out a product from said blank; heating said product to a temperature of 930°–970°C; holding said product at said temperature for 1.5 to 3 minutes per each millimeter of thickness of said product, and cooling the product at a rate of 85°–250° per minute.

* * * * *